(12) United States Patent
Lathif et al.

(10) Patent No.: US 12,379,905 B2
(45) Date of Patent: Aug. 5, 2025

(54) TRANSFORMATION OF LEGACY CODE FOR CLOUD ENVIRONMENT

(71) Applicant: SAP SE, Walldorf (DE)

(72) Inventors: Riswan Lathif, Munich (DE); Matthias Schneider, Munich (DE)

(73) Assignee: SAP SE, Walldorf (DE)

( * ) Notice: Subject to any disclaimer, the term of this patent is extended or adjusted under 35 U.S.C. 154(b) by 197 days.

(21) Appl. No.: 18/476,832

(22) Filed: Sep. 28, 2023

(65) Prior Publication Data

US 2025/0110708 A1  Apr. 3, 2025

(51) Int. Cl.
| | |
|---|---|
| G06F 15/16 | (2006.01) |
| G06F 8/35 | (2018.01) |
| G06F 8/51 | (2018.01) |
| G06F 8/60 | (2018.01) |
| G06F 9/445 | (2018.01) |
| G06F 9/455 | (2018.01) |
| G06F 9/48 | (2006.01) |
| G06F 9/50 | (2006.01) |
| H04L 12/741 | (2013.01) |
| H04L 29/08 | (2006.01) |

(52) U.S. Cl.
CPC .................. *G06F 8/35* (2013.01); *G06F 8/51* (2013.01); *G06F 8/60* (2013.01)

(58) Field of Classification Search
CPC ..... G06F 8/35; G06F 8/51; G06F 8/60; G06F 8/77; G06F 16/1767; G06F 16/2315; G06F 8/38; G06F 9/44536; G06F 9/451; G06F 9/44521; G06F 8/71; G06F 21/577; G06F 9/4856
See application file for complete search history.

(56) References Cited

U.S. PATENT DOCUMENTS 9,256,412 B2 * 2/2016 Genevski .................. G06F 8/60
11,172,022 B2 * 11/2021 Aerdts ................ H04L 67/1095

* cited by examiner

*Primary Examiner* — Thuy Dao
(74) *Attorney, Agent, or Firm* — Buckley, Maschoff & Talwalkar LLC

(57) ABSTRACT

A system and method include reception of first code associated with an on-premise runtime environment and a first programming language, identification of tokens associated with the first programming language in the first code, removal of state dependencies from the first code based on the identified tokens and on transformation data mapping one or more of the identified tokens to a respective code transformation, to generate second code, execution of performance transformations on the second code to generate third code, execution of functional tests on the third code, in response to a determination that the functional tests were passed, separation of the third code into functional units to generate fourth code, application of a security function to one or more of the functional units to generate fifth code, and deployment of the fifth code to a cloud-based runtime environment.

15 Claims, 8 Drawing Sheets

TRANSFORMATION OF LEGACY CODE FOR CLOUD ENVIRONMENT

BACKGROUND

Modern organizations utilize computing systems to manage their operations. Historically, the computing systems include applications and database systems executed by on-premise servers. The computing system landscape of a large organization may be quite complex, including distributed compute and/or storage, failover and backup systems. Some organizations have utilized applications and database systems for decades, with only incremental upgrades to the underlying code.

Cloud computing offers scalability, robustness and other efficiencies over traditional on-premise computing. Accordingly, organizations desire to migration some or all of their applications and database systems to the cloud. The code of these applications and database systems is typically not suitable for execution in the cloud.

Typically, creating a cloud application involves writing cloud-compliant code from scratch. For organizations with large installed code bases (i.e., legacy code), this undertaking would be extremely time- and resource-consuming. Writing new code from scratch would also undermine the advantages which organizations enjoy as incumbent providers to their customers.

Attempts have been made to port legacy code to the cloud in an automated manner. These attempts result in technical issues which require significant manual intervention to resolve. Moreover, these systems do not consider security threats which do not exist in an on-premise environment, such as shared hardware, multi-tenant software architectures, and public endpoint exposure.

Systems are desired to facilitate efficient conversion of legacy code to cloud-compliant code. Such systems preferably include measures suitable for secure operation of the converted code in a cloud deployment.

DETAILED DESCRIPTION

The following description is provided to enable any person in the art to make and use the described embodiments. Various modifications, however, will be readily-apparent to those in the art.

Some embodiments facilitate the conversion of legacy code to cloud-compliant code by subjecting it to a series of transformations. The transformations conform to cloud development standards, while ensuring that the original functionality of the legacy code is preserved to the extent allowed by cloud-development standards. The code may undergo a series of tests after each transformation stage, proceeding to the next stage only if the tests are passed. If a test fails, the same stage may be repeated based on inputs from logs of the failed test.

Figure 1:
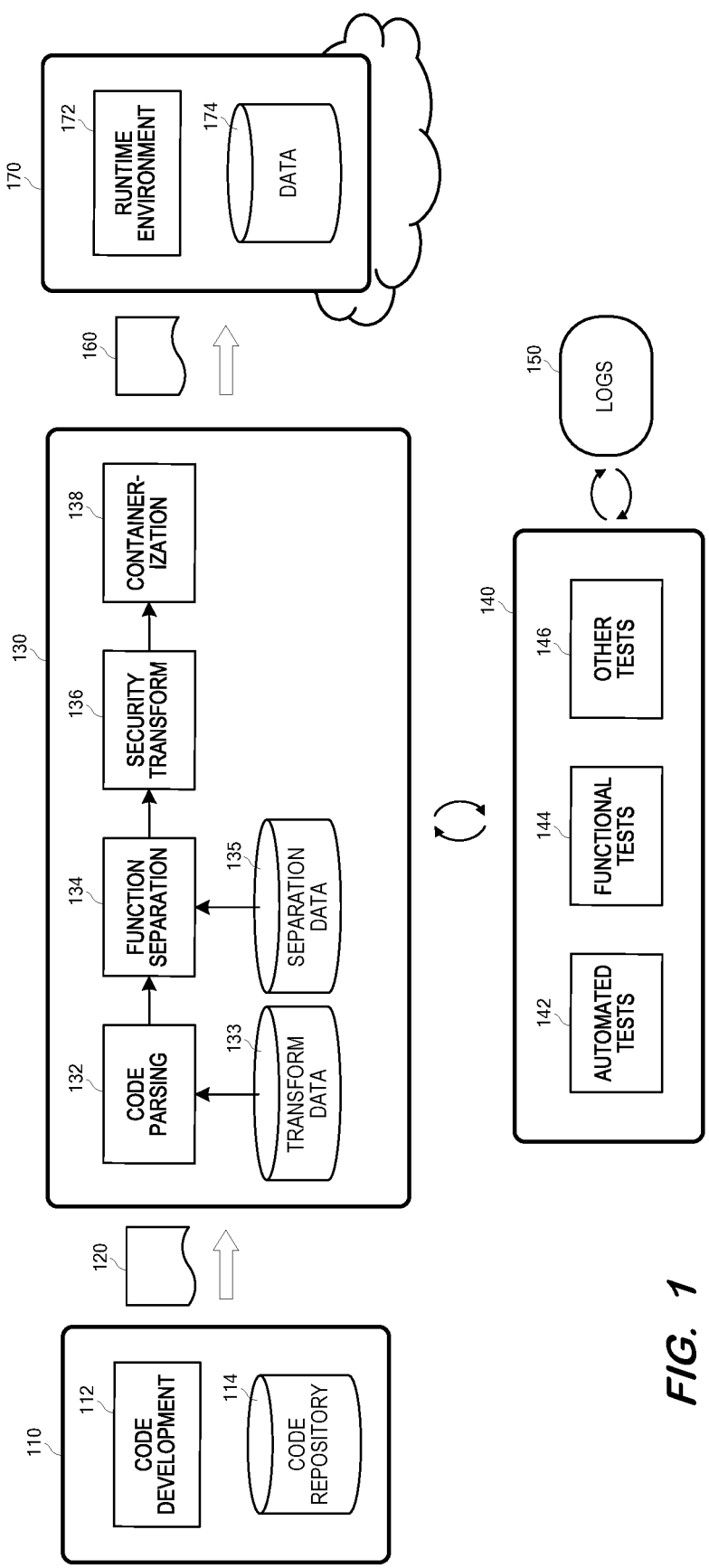
FIG. 1 illustrates a system to transform legacy code for cloud deployment according to some embodiments.

FIG. 1 illustrates an architecture according to some embodiments. Each of the illustrated components of FIG. 1 may be implemented using any suitable combinations of computing hardware and/or software that are or become known. Such combinations may include cloud-based implementations in which computing resources are virtualized and allocated elastically. In some embodiments, two or more components are implemented by a single computing device or virtual machine.

More particularly, embodiments may be on-premise, cloud-based, distributed (e.g., with distributed storage and/or compute nodes) and/or deployed in any other suitable manner. Each computing system described herein may comprise disparate cloud-based services, a single computer server, a cluster of servers, and any other combination that is or becomes known. All or a part of each system may utilize Infrastructure-as-a-Service (IaaS), Platform-as-a-Service (PaaS) and/or Software-as-a-Service (SaaS) offerings owned and managed by one or more different entities as is known in the art.

Developer system 110 may comprise a computing system executing program code of code development application 112. Generally, a developer may interact with code development application 112 to generate, modify, compile and/or debug program code. Such program code may conform to any programming language that is or becomes known. Code repository 114 may comprise any storage device or storage system for storing code. Code repository 114 may also store other data desired for operation of system 110 and other unshown applications which might be executed by system 110.

Developer system 110 may be cloud-based according to some embodiments. For example, developer system 110 may comprise an integrated development environment which is accessible via a client application executed by a local computing system (not shown) of a developer. The client application may comprise a Web browser, a Java application executing within a virtual machine of a Web browser and/or any other suitable type of client application.

It will be assumed that code repository 114 stores code which for various reasons might not be suitable for cloud-based execution (e.g., execution by a virtual machine accessed by users via Web protocols). This code is referred to herein as legacy code. FIG. 1 illustrates transmission of legacy code 120 from system 110 to transformation engine 130. Legacy code 120 need not have been created using code development application 112 of system 110. In this regard, legacy code 120 may be received by transformation engine 130 from any system which stores code such as legacy code 120, even if the code was not created on the transmitting system.

Transformation engine 130 and test engine 140 may comprise any combination of on-premise, cloud-based, virtual and non-virtual servers. Each of components 132, 134, 136 and 138 of transformation engine 130 comprises program code which may be executed by any number and combination of servers. Data 133 and 135 may be stored in a single or multiple data storage systems which may be separate from the one or more servers which execute components 132, 134, 136 and 138. Tests 142, 144 and 146 of test engine 140 may comprise code and/or data used for conducting software tests as is known in the art.

In operation, code parsing component 132 parses code 120 and tokenizes the parsed code into tokens. The tokens correspond to the source language of code 120. Transform data 133 may include a listing of tokens for one or more source languages, and code parsing component 132 may use this listing to tokenize code 120. Code parsing component 132 then transforms code 120 based on the tokens to remove state dependency and improve performance. Examples of these transformations are described below.

The transformed code should retain the desired functionality of legacy code 120. Accordingly, code transformed by component 132 is tested using appropriate ones of tests 142, 144 and 146 to ensure that such functionality is preserved. The functionality may include performance requirements such as but not limited to processing time and memory consumption. If the testing determines that the transformed code does not provide the desired functionality, code parsing component 132 may further transform the code until the tests are passed, or the transformation process may be terminated.

Functional separation component 134 separates the transformed code into code representing distinct functions. For example, the legacy code may conform to the Model, View, Controller programming model. This model may be defined by separation data 135. Using such definitions, component 134 may identify code which relates to UI functions (i.e., View code), code which relates to database access (i.e., Model code), and code which relates to data processing (i.e., Controller code). The identified code may then be separated into distinct code blocks. By separating the code in this manner, the code may be deployed as different services which correspond to one or more of the functions. The separated code is tested using the tests of test engine 140, and the results of the testing are stored in logs 150.

Security transform component 136 secures the separated code in view of cloud security concerns. Securing the code, examples of which are described in detail below, may include adding encryption functionality and security checks where appropriate. According to some embodiments, security transform component adds session validations to every functional unit. The secured may be tested using appropriate tests of engine 140.

The secured code is containerized by containerization component 138. As is known in the art, containerized code may be particularly suitable for deployment in cloud architectures. For example, virtual machines may be deployed to support docker or Kubernetes containers in which the containerized code may be executed.

Code 160 of FIG. 1 therefore represents a transformed, separated, secured and containerized version of code 120. Code 160 may be deployed to the cloud. For example, cloud server 170 may comprise a cloud-based virtual machine supporting runtime environment 172 in which code 160 may be executed. Cloud server 170 may access data 174 which may be generated or needed during execution of code 160.

In operation, code parsing component 132 parses code 120 and tokenizes the parsed code into tokens. The tokens correspond to the source language of code 120. Transform data 133 may include a listing of tokens for one or more source languages, and code parsing component 132 may use this listing to tokenize code 120. Code parsing component 132 then transforms code 120 based on the tokens to remove state dependency and improve performance. Examples of these transformations are described below.

The transformed code should retain the desired functionality of legacy code 120. Accordingly, code transformed by component 132 is tested using appropriate ones of tests 142, 144 and 146 to ensure that such functionality is preserved. The functionality may include performance requirements such as but not limited to processing time and memory consumption. If the testing determines that the transformed code does not provide the desired functionality, code parsing component 132 may further transform the code until the tests are passed, or the transformation process may be terminated.

Functional separation component 134 separates the transformed code into code representing distinct functions. For example, the legacy code may conform to the Model, View, Controller programming model. This model may be defined by separation data 135. Using such definitions, component 134 may identify code which relates to UI functions (i.e., View code), code which relates to database access (i.e., Model code), and code which relates to data processing (i.e., Controller code). The identified code may then be separated into distinct code blocks. By separating the code in this manner, the code may be deployed as different services which correspond to one or more of the functions. The separated code is tested using the tests of test engine 140, and the results of the testing are stored in logs 150.

Security transform component 136 secures the separated code in view of cloud security concerns. Securing the code, examples of which are described in detail below, may include adding encryption functionality and security checks where appropriate. According to some embodiments, security transform component adds session validations to every functional unit. The secured may be tested using appropriate tests of engine 140.

The secured code is containerized by containerization component 138. As is known in the art, containerized code may be particularly suitable for deployment in cloud architectures. For example, virtual machines may be deployed to support docker or Kubernetes containers in which the containerized code may be executed.

Code 160 of FIG. 1 therefore represents a transformed, separated, secured and containerized version of code 120. Code 160 may be deployed to the cloud. For example, cloud server 170 may comprise a cloud-based virtual machine supporting runtime environment 172 in which code 160 may be executed. Cloud server 170 may access data 174 which may be generated or needed during execution of code 160.

Figure 2A:
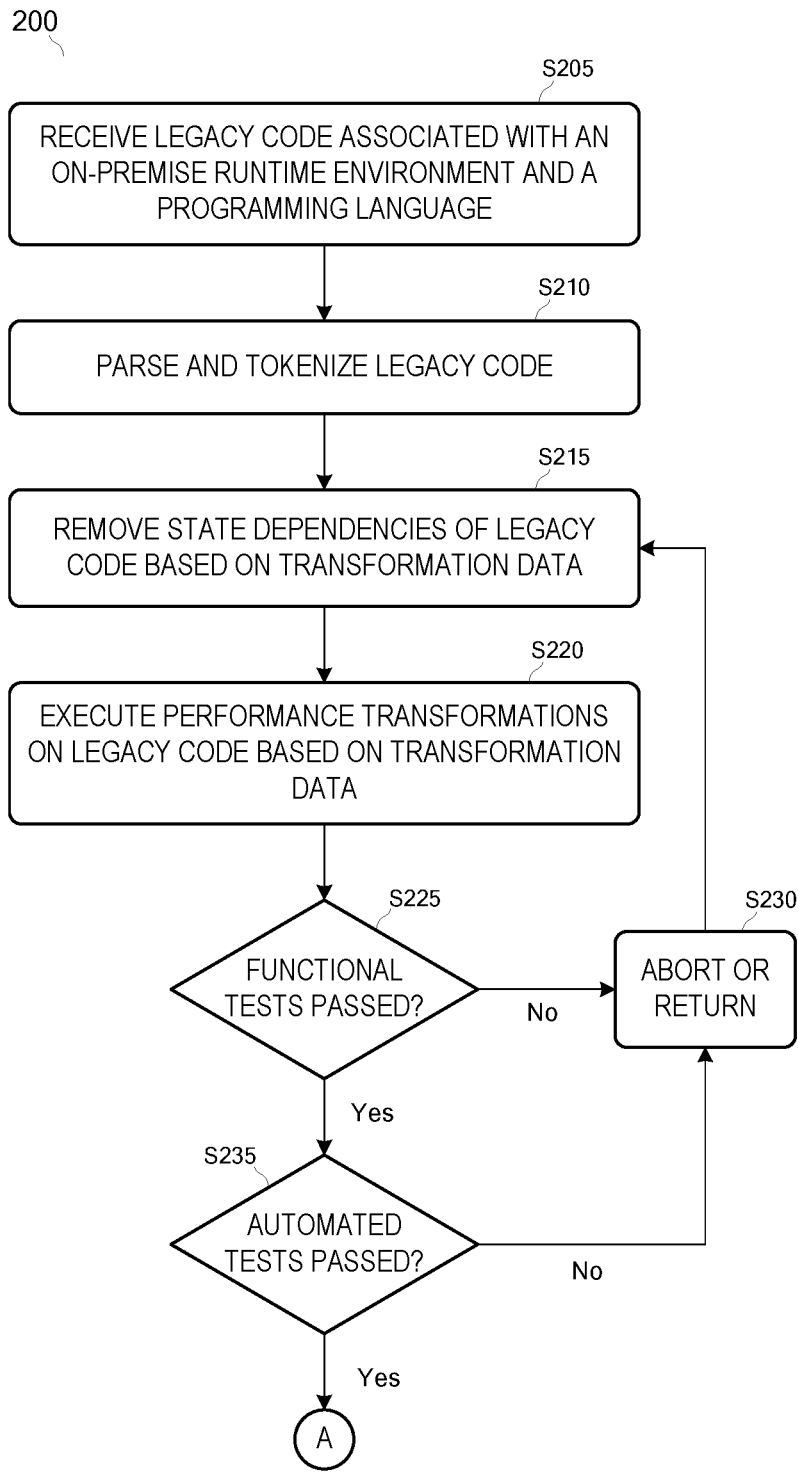
FIGS. 2A and 2B comprise a flow diagram of a process to transform legacy code for cloud deployment according to some embodiments.
Figure 2B:
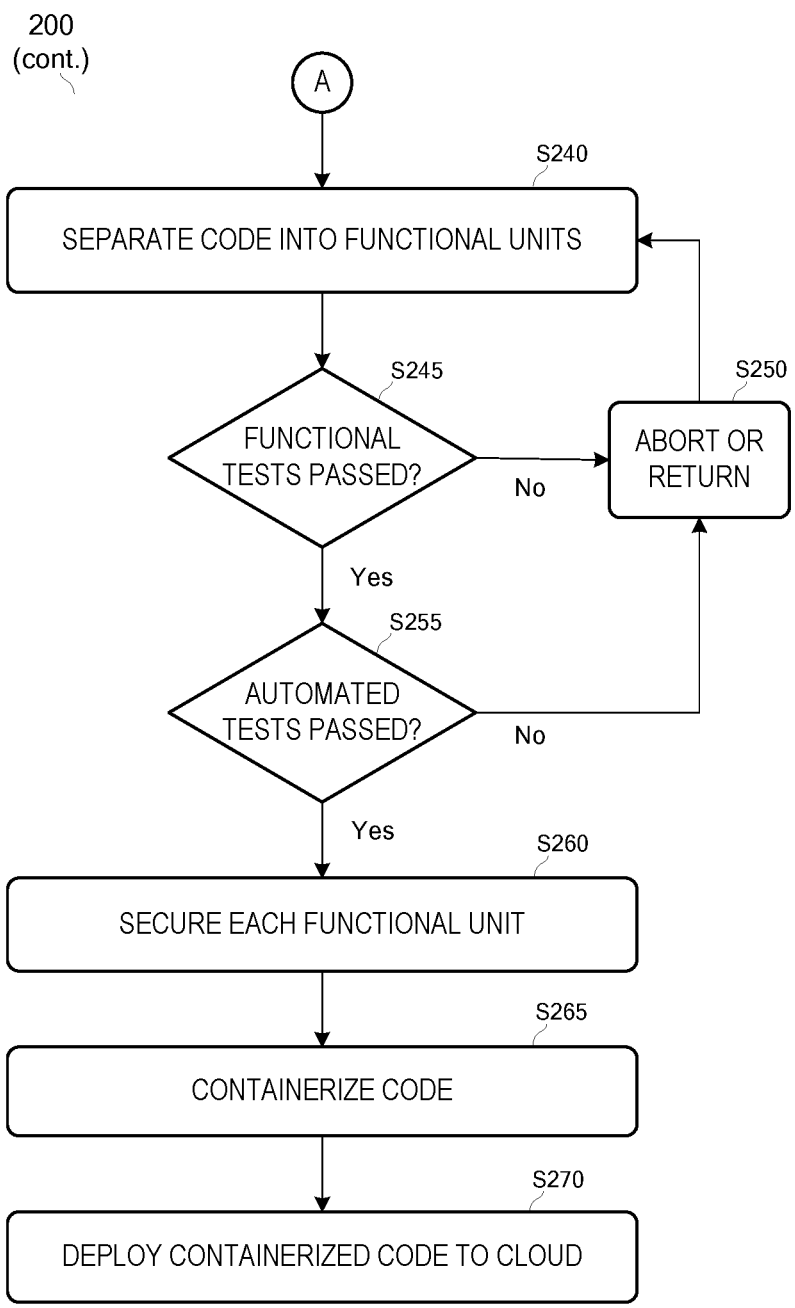

FIGS. 2A and 2B comprise a flow diagram of process 200 to transform legacy code for cloud deployment according to some embodiments. Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

Initially, legacy code is received at S205. The legacy code is associated with (i.e., is compatible with) an on-premise runtime environment and conforms to a programming language. The legacy code is parsed and tokenized at S210. As noted above, the tokens determined during the tokenization correspond to the programming language of the legacy code.

State dependencies of the legacy code are removed at S215 based on transformation data. In one example, a target cloud runtime environment prohibits the use of the keyword CREATE to create a Class Object. This prohibition is reflected in transformation data which is utilized during S215. Accordingly, the CREATE keyword is removed at S215 and replaced with code conforming to the target cloud runtime environment and specified in the transformation data.

At S220, performance-related transformations are executed based on the transformation data. For example, multiple SELECT statements on a same table may be merged, Big-O transformations may be applied, and the call structure may be flattened to remove layers and call the data source directly.

Functional tests are applied to the currently-modified version of the legacy code at S225. The functional tests may determine whether the modified code achieves the same functional results as the original legacy code, and also whether the modified code meets performance requirements. Tests according to some embodiments may include unit tests associated with specific code units, such as functions or methods, integration tests which simulate interactions such as user selection of a specific control to evaluate if related functionality and objects work properly, and end-to-end tests which are integration tests that work with real backend data.

Flow proceeds to S230 if the code does not pass the functional tests. At S230, it may be determined to repeat S215 and S220 to modify the legacy code differently. It may also be determined at S230 to abort process 200, for example because S215 and S220 have been already repeated a number of times. The code is subjected to automated tests at S235. Flow also proceeds to S230 and continues as described above if the code does not pass the automated tests.

If all tests are passed, flow proceeds to S240 to separate the code into functional units as described above. Again, functional tests are applied to the current version of the code at S245 and, if successful, automated tests are applied at S255. Flow reaches S250 if the tests at S245 or S255 are not passed. As described with respect to S230, it may be determined at S250 to return to S240 to separate the code differently, or to abort process 200.

If the tests at S245 and S255 are passed, the functional units created at S240 are secured. As will be described with respect to FIGS. 5 and 6, securing the functional units may include adding encryption, security checks, and session validations. The secured code is containerized at S265. Finally, at S270, the containerized code is deployed to a cloud-based runtime environment.

Figure 3:
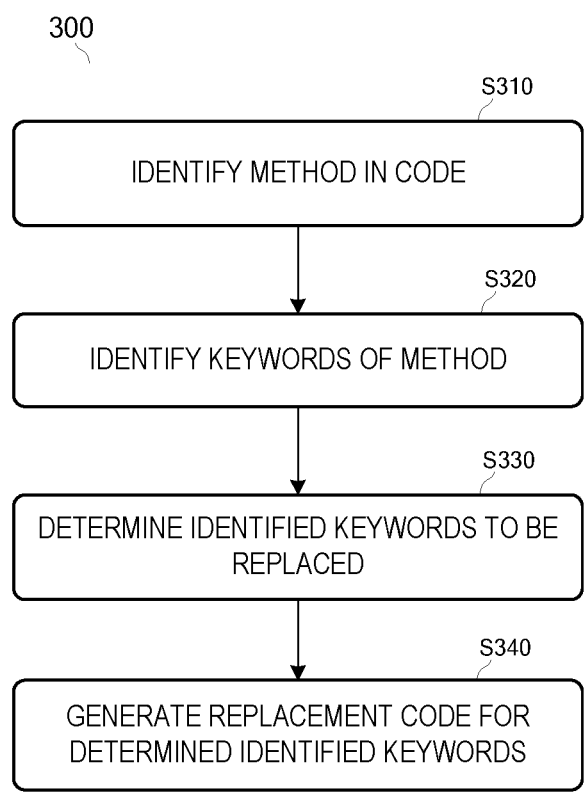
FIG. 3 comprises a flow diagram of a process to generate replacement code according to some embodiments.

FIG. 3 is a flow diagram of process 300 to generate replacement code at S220 according to some embodiments. First, a method is identified in the code at S310.

In one example of S310, the code is analyzed line-by-line. The first occurrences of tokens "class" and "endclass" are detected to identify the bounds of a class within the code. Within these bounds, the class "definition" token is located and the token "methods" is identified in the "public" section of the definition. Next, a corresponding method name is located in the "implementation" section of the class, having the structure: "method" [method name].

Keywords of the method are identified at S320. According to some embodiments, the body of the method is scanned line-by-line and written into a method array until the keyword "endmethod" is scanned. Next, each line of the method array is searched to identify specific tokens, i.e., keywords. Identification of the keywords may include referring to transformation data which specifies the keywords for the subject programming language as described above.

At S330, it is determined to replace some of the identified keywords. The determination may be based on transformation data indicating keywords which are not suitable for the target cloud runtime environment. Such transformation data may also be used at S340 to generate replacement code to replace the legacy code including the identified keywords determined at S330. In this regard, the transformation data may indicate both the non-suitable keywords and logic for replacing the keywords with code which is compatible with the target cloud runtime environment, and which provides the same functionality as the replaced code. The logic may be parameterized and/or executable code/script.

Figure 4:
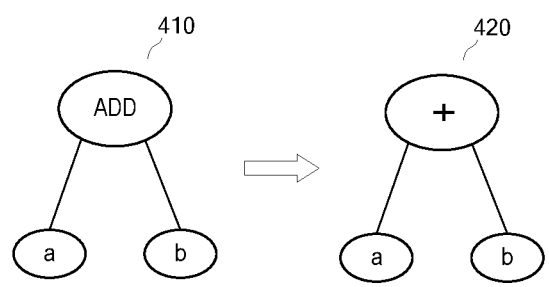
FIG. 4 is a diagram illustrating transformation of legacy code keywords according to some embodiments.

Some embodiments of S330 may include parsing each statement and generating a syntax tree internally. FIG. 4 shows a simplified version of syntax tree 410 generated at S330 according to some embodiments. Next, the syntax tree is traversed to find keywords which are not cloud-compatible. It will be assumed that keywords ADD, SUBTRACT, MULTIPLY, DIVIDE are not cloud-compatible. Accordingly, the ADD keyword of tree 410 is determined at S330.

It will also be assumed that the target cloud environment uses keywords "+", "−", "*" and "/" in lieu of the keywords listed above. The ADD node of tree 410 is therefore pruned at S340 and replaced with the equivalent cloud keywords "+", resulting in syntax tree 420.

According to some embodiments, a Large Language Model is trained to generate replacement code at S340 based on current code to be replaced. Such a model may be trained using online documentation describing cloud-based improvements to source legacy programming languages. S340 ay therefore comprise sending a code transformation request to the trained model to generate a cloud-compatible statement which is functionally equivalent to a given non-compatible statement.

Figure 5:
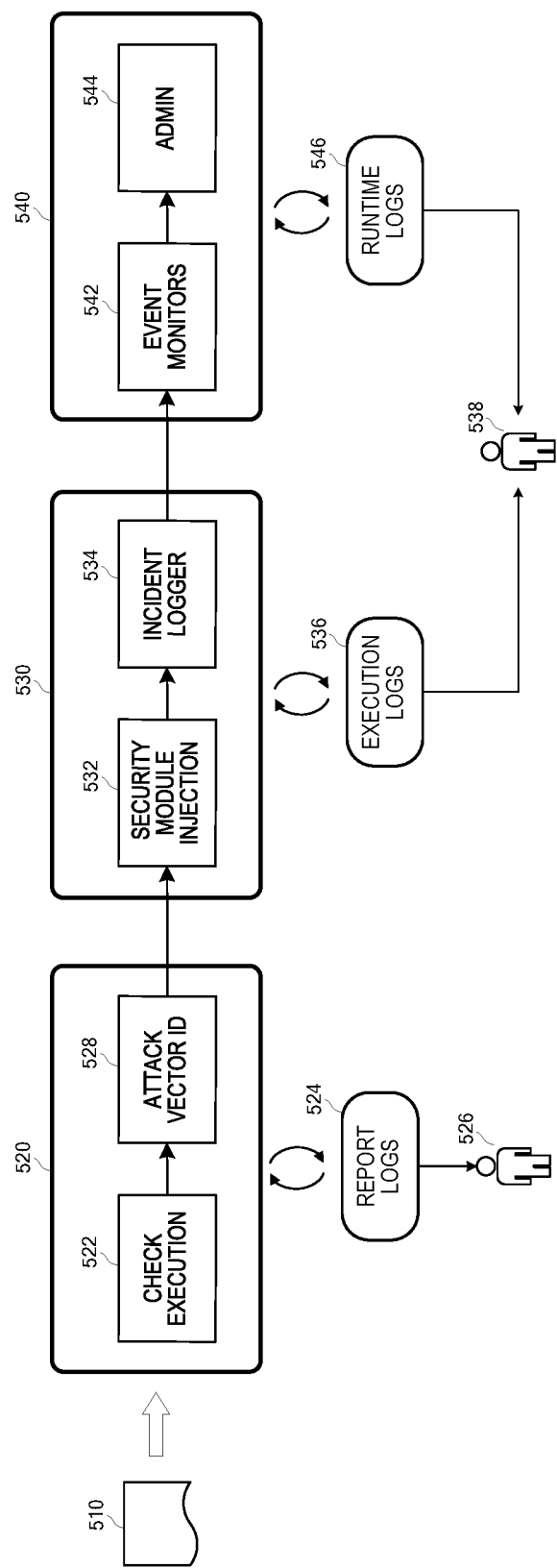
FIG. 5 illustrates a system to secure legacy code for cloud deployment according to some embodiments.
Figure 6:
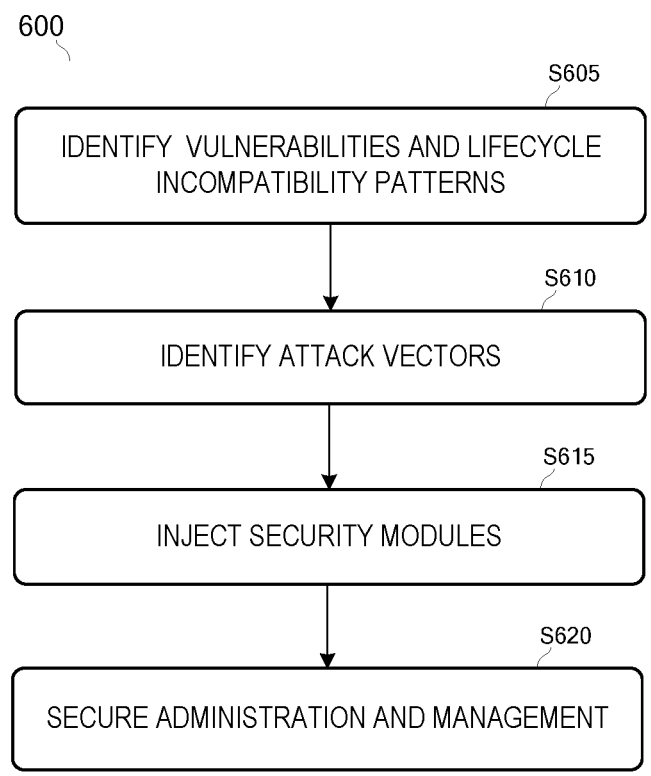
FIG. 6 is a flow diagram of a process to secure legacy code for cloud deployment according to some embodiments.

FIG. 5 illustrates a system to secure legacy code for cloud deployment according to some embodiments. The FIG. 5 system includes may comprise an embodiment of security transform component 136 of FIG. 1. FIG. 6 is a flow diagram of process 600 to secure legacy code for cloud deployment according to some embodiments. Process 600 will be described in conjunction with the components of FIG. 5, but embodiments of process 600 and of FIG. 5 are not limited thereto.

Transformed and functionally-separated code 510 is received by vulnerability identification component 520. Check execution component 522 identifies vulnerabilities and lifecycle incompatibility patterns of code 510 at S605. Vulnerability identification may include the identification of issues such as unauthorized access and data leaks in code, etc. Identified vulnerabilities are specified in a report stored in report logs 524, where it may be viewed by developer 526.

In some embodiment, vulnerabilities may be associated with known code fixes which may be deployed by developer 526. Developer 526 may add code fixes specific to various vulnerabilities. If a new vulnerability is identified by the system or reported by a developer, the vulnerability identification at S605 may be updated to include the new vulnerability.

Lifecycle incompatibility patterns are dynamic checks which look for issues which may occur after the code is deployed. For example, a check may identify two different services which are able to modify the same table, but which are unaware of one another. This scenario might result in corruption of the data in the table after code deployment.

After identification and patching of vulnerabilities and lifecycle incompatibility patterns, attack vector identification component 528 identifies attack vectors at S610. In some embodiments, attack vector identification component 528 uses in-build threat modelers with known attack vectors such as, for example, SQL injection. The results of the attacks are recorded in logs 524.

Security injection component 530 includes security module injection component 532 to inject modules in the existing code at S615. This injection creates a secure environment in which the code executes. The security injection may conform to the "Dependency Injection" software design pattern. According to this pattern, the application code does not handle cloud security, rather this is handled by injected reusable secure modules. The modules ensure that the code always runs within a secure execution environment and is executed with least-privileged access which still allows execution of the application code. The modules may also provide data encryption, secure communication such as TLS, etc.

According to some embodiments, other security modules are injected after code execution to ensure that database commits are clean and database logs do not indicate errors. If not, the modules roll back any corresponding changes so as to remedy any harm caused by an attack. Incident logger 534 logs such incidents and records corresponding data in execution logs 536. Execution logs 536 may be reviewed by administrator 538 to maintain secure operation.

In this regard, at S620, security administration and management component 540 monitors the security of the code during execution. Event monitors 542 may be injected by component 532 and executed during runtime to create runtime logs 546. Logs 546 may also be reviewed by administrator 538 to ensure proper operation.

Administration component 544 grants administrator 538 higher privileges to access the runtime than those granted to other users. Component 544 may whitelist administrator devices and deny any administrator-level request received from an unrecognized device.

Figure 7:
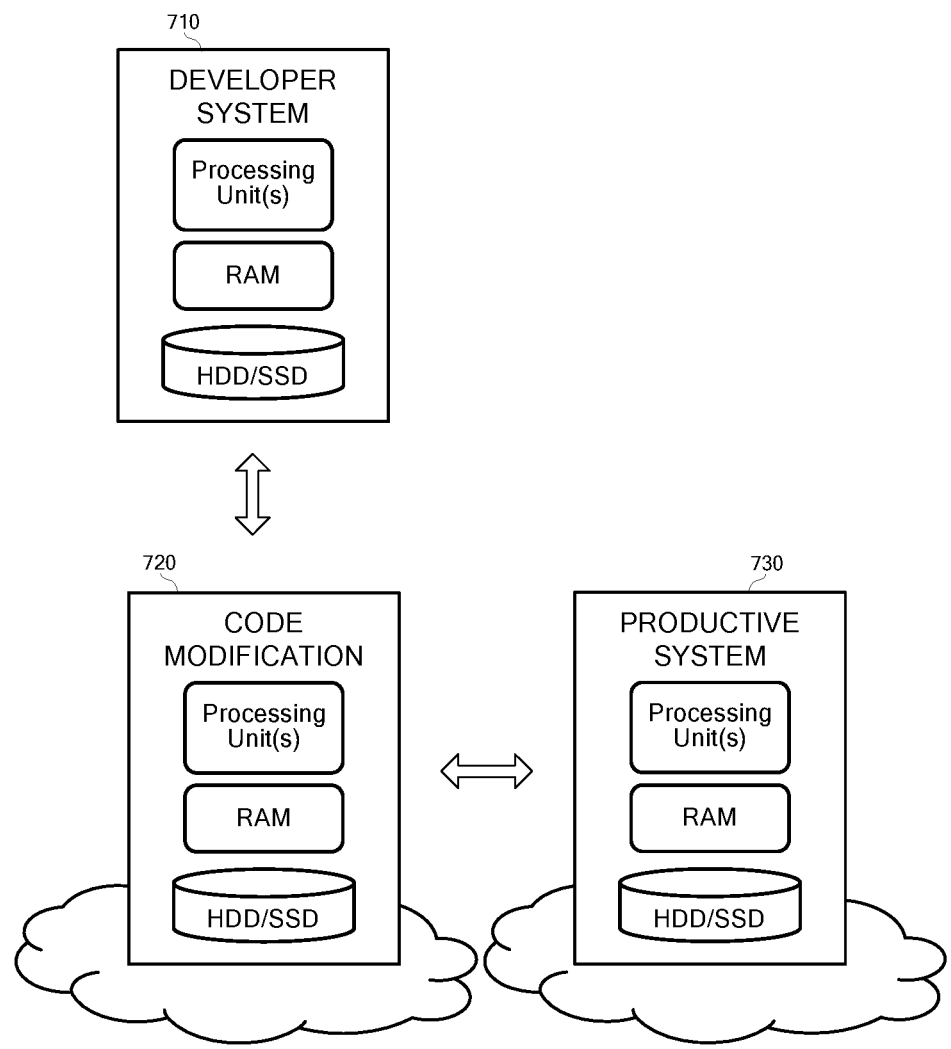
FIG. 7 is a diagram of a cloud-based implementation according to some embodiments.

FIG. 7 is a diagram of a cloud-based implementation according to some embodiments. Developer system 710 may comprise a local computing system operated by a developer to initiate transformation of legacy code for cloud deployment. Code modification system 720 may execute the processes described herein to modify code, which may then be deployed to a cloud runtime environment of productive system 730. Each of systems 720 and 730 may comprise cloud-based resources residing in one or more public clouds providing self-service and immediate provisioning, autoscaling, security, compliance and identity management features. Systems 720 and 730 may comprise servers or virtual machines of respective Kubernetes clusters, but embodiments are not limited thereto.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable recording media. Such media may include, for example, a hard disk, a DVD-ROM, a Flash drive, magnetic tape, and solid-state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system associated with a target runtime environment, the system comprising:
a memory storing processor-executable program code; and
at least one processing unit to execute the processor-executable program code to cause the system to:
receive first code associated with an on-premise runtime environment and a first programming language;
identify tokens associated with the first programming language in the first code;
remove state dependencies from the first code based on the identified tokens and on transformation data mapping one or more of the identified tokens to a respective code transformation, to generate second code;
execute performance transformations on the second code to generate third code;
execute functional tests on the third code;
in response to a determination that the functional tests were passed, separate the third code into functional units to generate fourth code;
apply a security function to one or more of the functional units to generate fifth code; and
deploy the fifth code to a cloud-based runtime environment.

2. A system according to claim 1, the at least one processing unit to execute the processor-executable program code to cause the system to:
containerize the fifth code,
wherein deployment of the fifth code to a cloud-based runtime environment comprises deployment of the containerized fifth code to a container-based runtime environment.

3. A system according to claim 1, the at least one processing unit to execute the processor-executable program code to cause the system to:
execute functional tests on the fourth code,
wherein the security function is applied in response to a determination that the functional tests on the fourth code were passed.

4. A system according to claim 1, wherein removal of state dependencies from the first code comprises:
determination of a statement of the first code including an identified keyword;
providing of the statement to a trained large language model;
reception of replacement code from the trained large language model; and
replacement of the statement of the first code with the replacement code.

5. A system according to claim 4, the at least one processing unit to execute the processor-executable program code to cause the system to:
  containerize the fifth code,
  wherein deployment of the fifth code to a cloud-based runtime environment comprises deployment of the containerized fifth code to a container-based runtime environment.

6. A method comprising:
  receiving first code associated with an on-premise runtime environment and a first programming language;
  identifying tokens associated with the first programming language in the first code;
  removing state dependencies from the first code based on the identified tokens and on transformation data mapping one or more of the identified tokens to a respective code transformation, to generate second code;
  executing performance transformations on the second code to generate third code;
  executing functional tests on the third code;
  in response to a determination that the functional tests were passed, separating the third code into functional units to generate fourth code;
  applying a security function to one or more of the functional units to generate fifth code; and
  deploying the fifth code to a cloud-based runtime environment.

7. A method according to claim 6, further comprising:
  containerizing the fifth code,
  wherein deploying the fifth code to a cloud-based runtime environment comprises deploying the containerized fifth code to a container-based runtime environment.

8. A method according to claim 7, further comprising:
  executing functional tests on the fourth code,
  wherein the security function is applied in response to a determination that the functional tests on the fourth code were passed.

9. A method according to claim 6, wherein removal of state dependencies from the first code comprises:
  determining a statement of the first code including an identified keyword;
  providing the statement to a trained large language model;
  receiving replacement code from the trained large language model; and
  replacing the statement of the first code with the replacement code.

10. A method according to claim 9, further comprising:
  containerizing the fifth code,
  wherein deploying the fifth code to a cloud-based runtime environment comprises deploying the containerized fifth code to a container-based runtime environment.

11. A non-transitory computer-readable recording medium storing processor-executable program code, the program code executable by a computing system to:
  receive first code associated with an on-premise runtime environment and a first programming language;
  identify tokens associated with the first programming language in the first code;
  remove state dependencies from the first code based on the identified tokens and on transformation data mapping one or more of the identified tokens to a respective code transformation, to generate second code;
  execute performance transformations on the second code to generate third code;
  execute functional tests on the third code;
  in response to a determination that the functional tests were passed, separate the third code into functional units to generate fourth code;
  apply a security function to one or more of the functional units to generate fifth code; and
  deploy the fifth code to a cloud-based runtime environment.

12. A medium according to claim 11, the program code executable by a computing system to:
  containerize the fifth code,
  wherein deployment of the fifth code to a cloud-based runtime environment comprises deployment of the containerized fifth code to a container-based runtime environment.

13. A medium according to claim 11, the program code executable by a computing system to:
  execute functional tests on the fourth code,
  wherein the security function is applied in response to a determination that the functional tests on the fourth code were passed.

14. A medium according to claim 11, wherein removal of state dependencies from the first code comprises:
  determination of a statement of the first code including an identified keyword;
  providing of the statement to a trained large language model;
  reception of replacement code from the trained large language model; and
  replacement of the statement of the first code with the replacement code.

15. A medium according to claim 14, the program code executable by a computing system to:
  containerize the fifth code,
  wherein deployment of the fifth code to a cloud-based runtime environment comprises deployment of the containerized fifth code to a container-based runtime environment.

* * * * *